(12) United States Patent
Jerichow et al.

(10) Patent No.: US 10,574,457 B2
(45) Date of Patent: Feb. 25, 2020

(54) INDICATOR FOR DETERMINATION OF KEY FOR PROCESSING MESSAGE IN COMMUNICATION SYSTEM

(71) Applicants: Alcatel-Lucent USA Inc., Murray Hill, NJ (US); Nokia Technologies Oy, Espoo (FI)

(72) Inventors: Anja Jerichow, Grafing (DE); Annett Seefeldt, Regensburg (DE); Suresh P. Nair, Whippany, NJ (US)

(73) Assignee: Nokia Technologies OY, Espoo (FI)

( * ) Notice: Subject to any disclaimer, the term of this patent is extended or adjusted under 35 U.S.C. 154(b) by 204 days.

(21) Appl. No.: 15/726,974

(22) Filed: Oct. 6, 2017

(65) Prior Publication Data

US 2018/0331830 A1 Nov. 15, 2018

Related U.S. Application Data

(60) Provisional application No. 62/505,472, filed on May 12, 2017.

(51) Int. Cl.
*H04L 29/06* (2006.01)
*H04L 9/30* (2006.01)
(Continued)

(52) U.S. Cl.
CPC .......... *H04L 9/3073* (2013.01); *H04L 9/006* (2013.01); *H04L 9/083* (2013.01); *H04L 9/0891* (2013.01); *H04L 9/0897* (2013.01); *H04L 9/14* (2013.01); *H04L 63/0442* (2013.01); *H04L 63/062* (2013.01); *H04W 12/0023* (2019.01); *H04W 12/04* (2013.01); *H04L 63/068* (2013.01)

(58) Field of Classification Search
CPC ........................... H04L 9/3073; H04L 9/0891
USPC .......................................................... 713/171
See application file for complete search history.

(56) References Cited

U.S. PATENT DOCUMENTS 9,942,034 B2 * 4/2018 Le Saint ............... H04L 9/0844
2013/0003971 A1 1/2013 Forsberg et al.
(Continued)

FOREIGN PATENT DOCUMENTS

WO PCT/US2018/030366 5/2018

OTHER PUBLICATIONS

3GPP, "3rd Generation Partnership Project; Technical Specification Group Services and System Aspects; System Architecture for the 5G System; Stage 2 (Release 15)," 3GPP TS 23.501 V0.4.0, Apr. 2017, 124 pages.

(Continued)

*Primary Examiner* — Longbit Chai
(74) *Attorney, Agent, or Firm* — Ryan, Mason & Lewis, LLP

(57) ABSTRACT

Key identification techniques for determination of appropriate keys for processing messages in communication systems are provided. In one or more methods, an indicator is assigned to each key pair provisioned in a communication system. The indicator is then sent to one or more network elements or functions in the communication system with a message encrypted with a first part of the key pair corresponding to the indicator. A network element or function receiving the encrypted message determines, based on the indicator, a corresponding second part of the key pair to use to process the encrypted message.

20 Claims, 4 Drawing Sheets

(51) Int. Cl.
*H04L 9/00* (2006.01)
*H04L 9/08* (2006.01)
*H04W 12/04* (2009.01)
*H04W 12/00* (2009.01)
*H04L 9/14* (2006.01)

(56) References Cited

U.S. PATENT DOCUMENTS

2013/0080779 A1* 3/2013 Holtmanns ......... H04L 63/0414
 713/168
2016/0127893 A1 5/2016 Mizikovsky et al.

OTHER PUBLICATIONS

3GPP, "3rd Generation Partnership Project; Technical Specification Group Services and System Aspects; Study on the Security Aspects of the Next Generation System (Release 14)," 3GPP TR 33.899 V1.1.0, Mar. 2017, 491 pages.
3GPP, "3rd Generation Partnership Project; Technical Specification Group Services and System Aspects; Procedures for the 5G System; Stage 2 (Release 15)," 3GPP TS 23.502 V0.1.0, Jan. 2017, 44 pages.
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol, (Release 14)," 3GPP TS 29.272 V14.0.0, Jun. 2016, 153 pages.

* cited by examiner

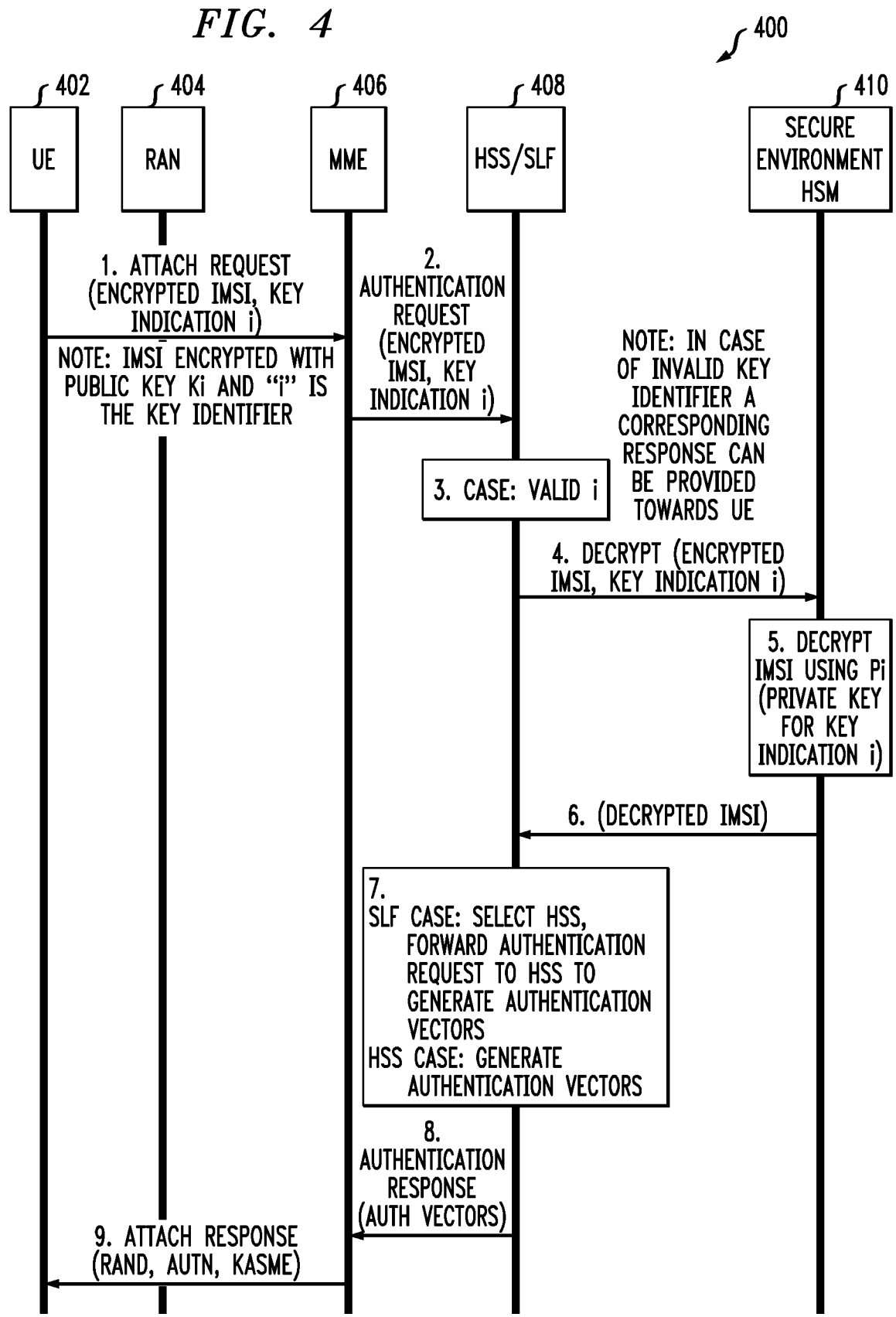

INDICATOR FOR DETERMINATION OF KEY FOR PROCESSING MESSAGE IN COMMUNICATION SYSTEM

CROSS-REFERENCE TO RELATED APPLICATION

The present application claims priority to the U.S. Provisional patent application identified as U.S. Ser. No. 62/505,472 filed May 12, 2017 and entitled "Indicator for Determination of Key for Processing Message in Communication System," the disclosure of which is incorporated by reference herein in its entirety.

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services intended to provide improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network or an eNB (evolved Node B) in an LTE network. The access point (e.g., gNB/eNB) is illustratively part of an access network of the communication system. For example, in a 5G network, the access network is referred to as a 5G System and is described in 5G Technical Specification (TS) 23.501, V0.4.0, entitled "Technical Specification Group Services and System Aspects; System Architecture for the 5G System," the disclosure of which is incorporated by reference herein in its entirety. In an LTE network, the access network is an Evolved Universal Terrestrial Radio Access Network (E-UTRAN). In general, the access point (e.g., gNB/eNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks.

SUMMARY

Illustrative embodiments provide security techniques for determination of appropriate cryptographic keys for processing messages in communication systems.

In one or more methods according to illustrative embodiments, a unique indicator is assigned to each cryptographic key pair provisioned in a communication system. The indicator is then sent to one or more network elements or functions in the communication system along with a message encrypted with a first part of the key pair corresponding to the indicator. A network element or function receiving the encrypted message determines, based on the indicator, a corresponding second part of the key pair to use to process the encrypted message.

In one illustrative example, the message may comprise a permanent identifier of given user equipment and the network element or function may comprise a server location function, a home subscriber server of the home network of the given user equipment, a secure module, or some other element or function in the communication system. The key pair may be a public/private key pair with the first part being a public key and the second part being a private key provisioned for the home network of the given user equipment. By using the indicator to look up the corresponding private key, the network element or function can efficiently decrypt or otherwise cause the message to be efficiently decrypted during authentication procedures.

Advantageously, if the operator of a home network needs to update the public key for its subscribers, illustrative embodiments enable network elements or functions to know which key is in use, and therefore avoid the situation that the given user equipment and the network element or function are out of synchronization (out-of-sync), and therefore can avoid loss of data.

While these techniques can be applied to various communication networks, they are particularly suitable for 5G and next generation communication networks.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 shows a message flow for a user equipment authentication procedure in an illustrative embodiment.

DETAILED DESCRIPTION

Figure 1:
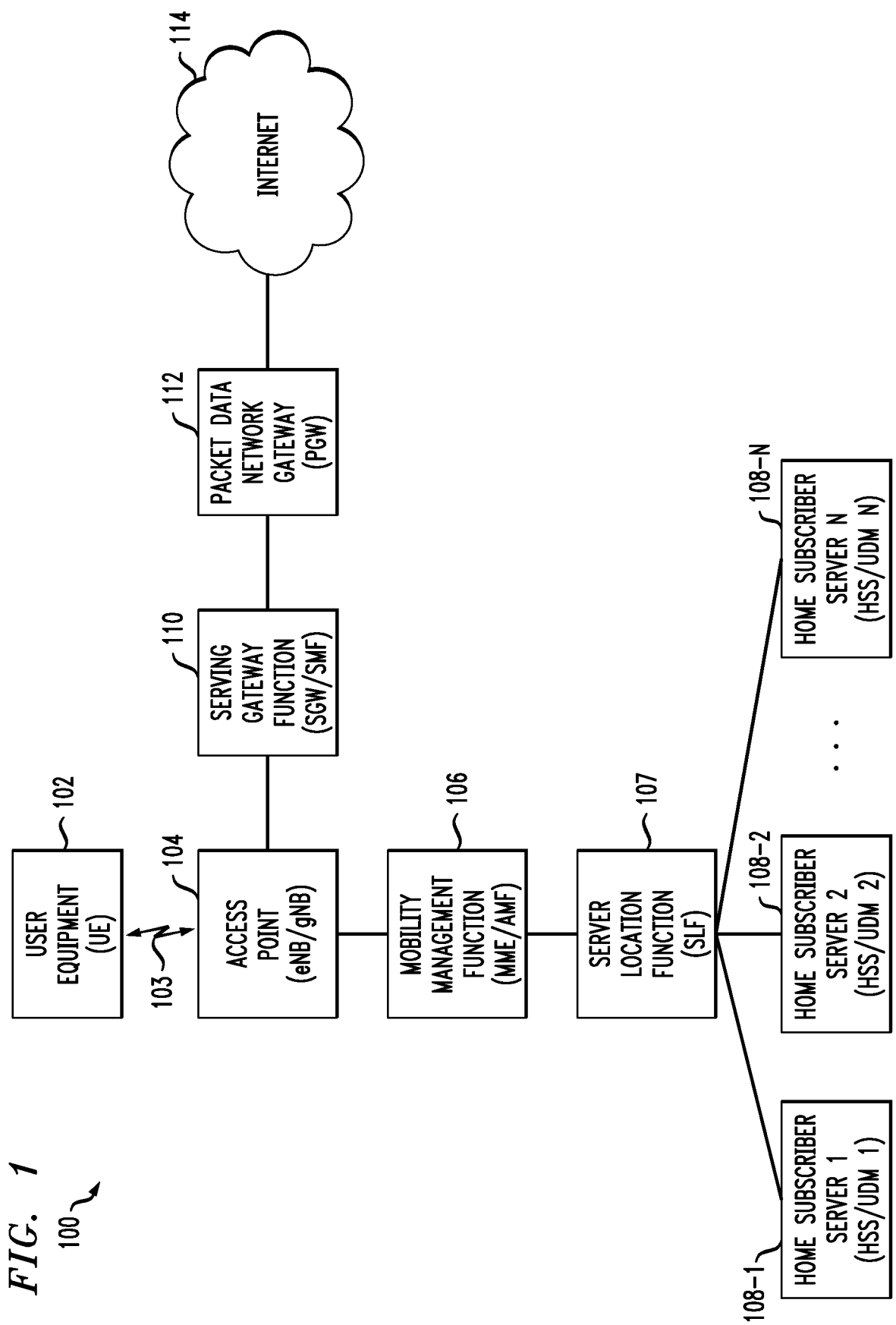
FIG. 1 is a block diagram of a communication system in an illustrative embodiment.

Embodiments will be illustrated herein in conjunction with example communication systems and associated techniques for managing authentication requests in a manner which protects the privacy of the user's subscription identity. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC) and a 3GPP next generation system (5G), the disclosed embodiments can be adapted in a straightforward manner to a variety of other types of communication systems including, but not limited to, WiMAX systems and Wi-Fi systems.

As mentioned above, privacy of subscription identifiers when communicating over the air interface between the user equipment and the network access point has been a significant issue for 2G/3G/4G networks. Efforts have been made in 5G networks to address this significant issue.

The above-referenced TR 33.899 describes several solutions to provide privacy over the air interface that can be generally grouped in three solution classes:

1) pseudonym solutions based on symmetric cryptographic systems, which demand a home subscriber server/function of the UE's home network to map a changing pseudonym to the permanent subscription identifier of the UE;

2) encryption of the permanent subscription identifier of the UE using the public key of the home network operator; and 3) encryption of the permanent subscription identifier of the UE using the public key of the serving network operator.

Note that, in one example, an International Mobile Subscriber Identity (IMSI) is a permanent subscription identifier (subscriber identity) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN).

Note also that in an LTE network, the home subscriber server/function is called a Home Subscriber Server (HSS), and in a 5G network it is called User Data Management (UDM) which may also comprise an Authentication and Security Function (AUSF) and an Authentication Credential Repository and Processing Function (ARPF) as part of the UDM function.

While illustrative embodiments are described herein from the perspective of the second solution class (i.e., the home network public key based solution), alternative embodiments may be implemented for one or more other solution classes. See SA2 TS 23.502 and SA3 TR 33.899, the disclosures of which are incorporated by reference herein in their entireties.

In the home network public key based solution, the home operator provides its public key to all home network subscribers. They will use it to encrypt the subscriber identity, which is, by way of example, the MSIN part of IMSI. Only the MSIN part needs to be encrypted, because MNC+MCC is needed by the serving network to route to the correct home network. Only the home HSS can decrypt the message because it possesses the private key that corresponds to the public key. Once the IMSI is identified, HSS/AuC (where AuC is the Authentication Center part of the HSS) will create authentication vectors (AVs) based on the distinct shared root key K between a user (subscriber) and the HSS/AuC. Similarly, in the 5G network, the UDM/ARPF creates the AV's requested via AUSF. AUSF and UDM could be co-located for optimization reasons.

An operator in his network may have implementations of multiple HSSs which allows him to manage distinct sets of users in different HSSs/UDMs. Because of the multiple HSSs, a Server Location Function (SLF) is implemented in front of a set of HSSs. Note that SLF may also be referred to as a Subscriber Location Function. The SLF analyses the authentication request for a user received from the MME/AMF and routes it to the correct HSS.

By way of example only, operation of the SLF is described in 3GPP TS 29.272 (Section 8: "User identity to HSS resolution") entitled "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)," the disclosure of which is incorporated by reference herein in its entirety. The SLF provides user identity (IMSI)-to-HSS resolution using a locally maintained subscriber profile database and routes Diameter messages containing the user authentication requests, as a Diameter proxy to the chosen HSS. Note that, in 5G, similar functionality would also be requested if 5G core network protocols are different from Diameter, e.g., using http-proxies. In the following descriptions, it is assumed that the SLF is covering both the DRA (Diameter Routing Agent) based solution as per 4G or any other proxy related solution dependent on protocol decisions for the 5G core network.

It is realized herein that the 5G UE and the HSS/UDM of its home network (public land mobile network or PLMN) share a long-term identifier (subscriber permanent identifier or SUPI), such as IMSI, and a long-term key K. As mentioned above, a home PLMN has a public key, which it has made available to the UE. Since this is a relationship between the operator and its subscribers, this can be a raw public key, i.e., no need for certificates (global public key infrastructure (PKI)). The home PLMN can pre-provision the public key in the UE or use an over-the-air (OTA) mechanism to distribute it. Every time the 5G UE is required to send its long-term identifier, the 5G UE encrypts the parts of the long-term identifier not needed for routing purposes (i.e., MSIN) with the public key of the home PLMN and sends the encrypted identifier to the serving or home PLMN. Long-term identifiers are needed for initial attach and if the serving network does not have a temporary identity available. Other reasons for sending long-term identifiers could be possible.

If the operator needs to update the public key for its subscribers, this cannot be done in one step. Thus, for a certain time there may be UEs using the old public key, while other UEs may have already established the new public key. Thus, in this situation, issues may arise for the HSS as to how it efficiently knows which key is in use, and therefore how to avoid the situation that UE and HSS are out of out-of-sync and data is lost.

Accordingly, illustrative embodiments as described herein address the above and other key management and authentication issues.

Whenever the UE is asked to provide its identity, it sends the encrypted identity and the HSS/UDM will retrieve the real identity. It is assumed that the HSS/UDM has a secure execution environment to decrypt any received request.

In a simple implementation, HSS/UDM could try to decrypt the encrypted identity with one key; if not successful, HSS/UDM would just use the other key to decrypt the encrypted identity. However, this is not an efficient solution.

As such, illustrative embodiments provide an indication of which key is in use by the introduction of a key pair indicator, e.g., flag, field, identifier, or some other identification. More particularly, a key pair indicator is uniquely assigned to a given public/private key pair. Then, the indicator is advantageously used by the UE to indicate which public key was used to encrypt its permanent identifier, and by the HSS/UDM or other network element/function, as will be explained, to efficiently decide which private key will be selected/used for decryption.

In one illustrative key provisioning embodiment, a cryptographic public/private key pair is generated. This may comprise the following:

(1) Generation of one or more public/private key pairs together with a unique key pair indicator (e.g., indication/flag/field/identifier) for each of the one or more public/private key pairs is performed in a trusted platform, e.g. TTP.

(2) The private key together with the key pair indicator of the public/private key pair is stored in a secure environment, e.g., a high security module (HSM).

(3) The HSS/UDM is provided with the key pair indicator of the public/private key pair in use.

(4) The UE is provided with the public key and the key pair indicator of the public/private key pair in use. The UE (Universal Integrated Circuit Card or UICC) stores the key pair indicator with the public key.

In one illustrative authentication embodiment, a usage methodology for the provisioned key pair and key pair indicator may comprise:

(1) The UE adds in each message, that includes the encrypted identity of the UE, the key pair indicator of the public key used to generate the encrypted identity (e.g., IMSI or part thereof).

(2) The HSS/UDM sends the key pair indicator together with the encrypted identity to the secure environment (HSM) for execution.

(3) The secure environment (HSM) can act very quickly and thereby efficiently analyze the received key pair indicator and provide the decrypted identifier (e.g. IMSI or part thereof) back to the HSS/UDM, which then proceeds with generation and provisioning of authentication vectors (AVs) in a conventional manner.

It is to be appreciated that, in alternative embodiments, instead of the HSS/UDM performing the above-enumerated steps/functions, the steps/functions can be performed by the SLF completely, or some combination of sharing the steps/functions can be implemented between the HSS/UDM and the SLF. Still further, other network elements/functions (other than the HSS/UDM or the SLF) can be configured to perform the above-enumerated and other steps. Alternatively, rather than a separate HSM, message decryption itself can be performed in the HSS/UDM or the SLF if a secure execution environment is available therein.

In some embodiments, SLF functionality in 5G may resemble the UDM discovery function of the Network-Function Repository Function (NRF) to discover the UDM instance which obtains the correct subscription information. As per TS 23.501, the UDM discovery function utilizes the NRF to discover the UDM instance(s) unless UDM information is available by other means, e.g., locally configured on NF (Network-Function) consumers, and selects a UDM instance based on the obtained UDM information. The UDM discovery function in NF consumers is applicable to both 3GPP access and non-3GPP access.

While no more than two public/private key pairs are typically needed (one current, and one for future), embodiments are not intended to be limited to two key pairs (e.g., operator specific implementations with more than two key pairs are contemplated). The initial provisioning of the UICC (or Mobile Equipment (ME)) would benefit if two public keys (including the key pair indicator) are stored. Since the home network (HN) operator replaces one public key by another public key (including the key pair indicator), UICC storage capacity is configured for at least two public keys. If one public key is disabled, it could be overwritten by the newly provided public key. However, since a UE may be switched off for a relatively long period of time, the operator policy may decide that it is beneficial to keep two or more key pairs in storage. By keeping at least two public keys in storage, a UE could react immediately in case of a failure message, i.e., switch to the other public key.

In one or more embodiments, the HN operator could also decide to send only a disable message for the public key (identified by the key pair indicator), i.e., in advance of actually rolling out the new public key for replacement.

Further, in one or more embodiments, HSS/UDM performs a mapping (e.g., look-up) procedure which comprises analysing the received key pair indicator to trigger the correct decryption by the secure environment (HSM).

Still further, one or more embodiments provide a failure code to the UE, which can be combined with the delivery of the new public key.

Given the above-described key pair indicator and key pair provisioning and usage embodiments, a wide variety of network configurations can be employed to implement these features. FIGS. 1-4 depict some of these network configurations. However, it is to be appreciated that embodiments are not limited to the network configurations illustrated herein or otherwise described below.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in LTE and 5G networks that provide the main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (eNB/gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., vehicle). Such communication devices are also intended to encompass devices commonly referred to as access terminals.

In one embodiment, UE 102 is comprised of a UICC and an ME. The UICC is the user-dependent part of the UE and contains at least one Universal Subscriber Identity Module (USIM) and appropriate application software. The USIM securely stores the IMSI number and its related key which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, an E-UTRAN or 5G System (or mixed) having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to a mobility management function 106. In an LTE network, the function is typically implemented by a Mobility Management Element (MME), while in a 5G network, the function is implemented by an Access and Mobility Management Function (AMF). Although not expressly shown, SEAF can be implemented with the AMF connecting a UE with the mobility management. Thus, K_SEAF would take over the role of the KASME in 5G. A mobility management function, as used herein, is the element or function in the core network (CN) part of the communication system that manages, among other network operations, access and authentication operations with the UE (through the access point 104).

The MME/AMF 106 in this illustrative embodiment is operatively coupled to an SLF 107. In illustrative embodiments, SLF 107 is configured to respond to indicators that are sent in messages it receives. As described above, SLF 107 may decrypt (or cause to be decrypted by an HSM) a subscriber identity (consulting the key pair indicator provided by the UE) or simply forward the encrypted information to the appropriate home network of UE 102 to have the corresponding HSS/UDM decrypt (or cause to be decrypted by an HSM) the identity (consulting the key pair indicator provided by the UE), depending on which network element is configured to perform the decryption. Thus, as shown, SLF 107 is operatively coupled to a plurality of HSSs/UDMs 108-1, 108-2, . . . , 108-N. These HSSs/UDMs represent the home networks of UEs that may attach to the communication system 100. SLF 107 is configured to provide the UE information to the appropriate HSS/UDM 108.

The access point 104 is also operatively coupled to a serving gateway function 110 (e.g., Serving Gateway (SGW) in an LTE network, and Session Management Function (SMF) in a 5G network), which is operatively coupled to a Packet Data Network (PDN) Gateway (PGW) 112. PGW 112 is operatively coupled to a Packet Data Network, e.g., Internet 114. MME/AMF 106 and SLF 107 may be considered part of a CN. MME/AMF 106 and SLF 107 can also be part of a serving network. Further typical operations and functions of such network elements are not described here since they are not the focus of the illustrative embodiments and may be found in appropriate 3GPP LTE or 5G documentation.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB/gNB, MME/AMF, SLF, SGW/SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via eNB/gNB 104.

Figure 2:
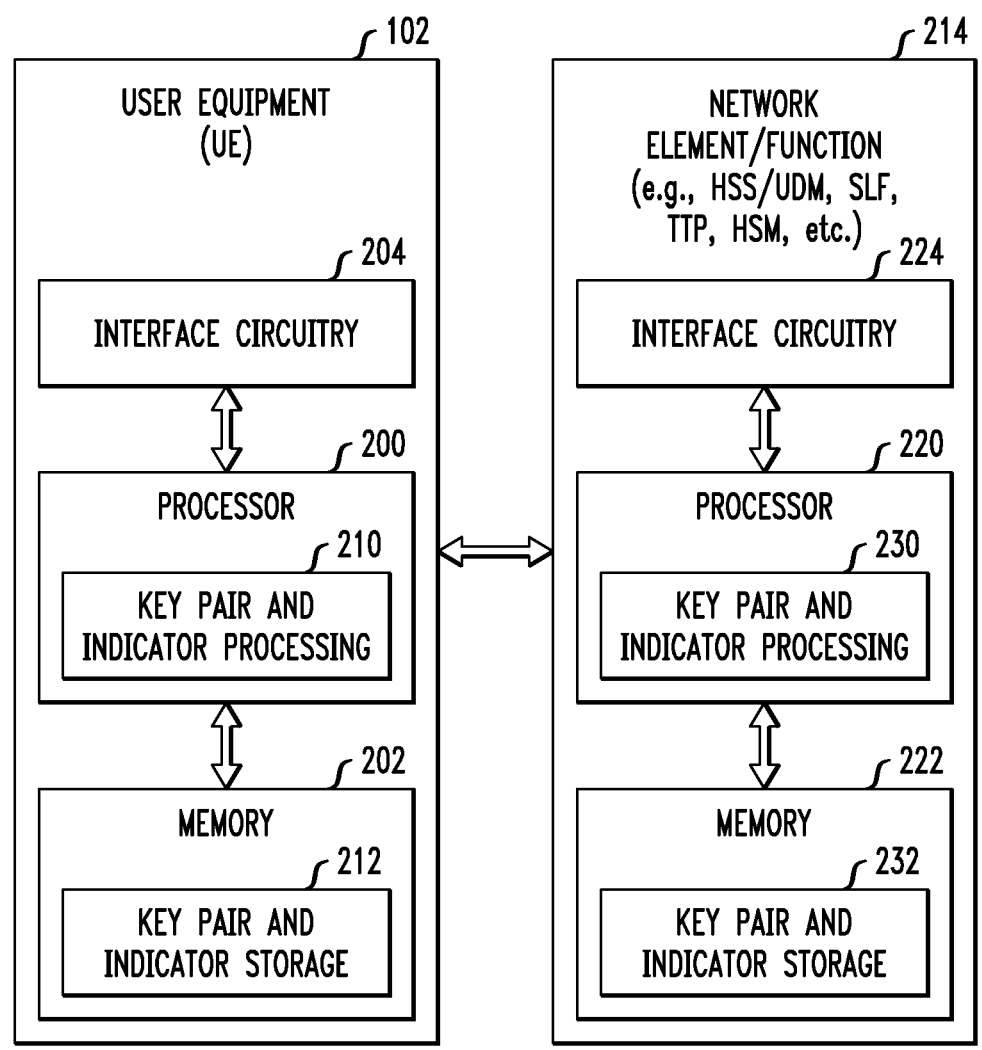
FIG. 2 shows a more detailed view of user equipment and a network element/function in an illustrative embodiment.

FIG. 2 shows a more detailed view of UE 102 and a network element/function 214 in an illustrative embodiment. It is to be appreciated that network element/function 214 represents a network element/function in the communication system 100 (FIG. 1) that is configured to decrypt (or cause to be decrypted) the UE identity using the private key of the correct public/private key pair by consulting the key pair indicator, as explained above. For example, network element/function 214 may be an SLF 107, an HSS/UDM 108, and/or HSM, or some other network elements/functions in the communication system. Network element/function 214 could also be part of the TTP and used for key provisioning as described herein.

The UE 102 comprises a processor 200 coupled to a memory 202 and interface circuitry 204. The processor 200 of the UE 102 includes a key pair and indicator processing module 210 that may be implemented at least in part in the form of software executed by the processor. The processing module 210 performs public/private key pair and key pair indicator provisioning and usage operations of the processes described in conjunction with subsequent figures and otherwise herein. The memory 202 of the UE 102 includes a key pair and indicator storage module 212 that stores a public key and key pair indicator and related data generated or otherwise used during key management and authentication operations.

The network element/function 214 comprises a processor 220 coupled to a memory 222 and interface circuitry 224. The processor 220 of the network element/function 214 includes a key pair and indicator processing module 230 that may be implemented at least in part in the form of software executed by the processor. The processing module 230 performs public/private key pair and key pair indicator provisioning and usage operations described in conjunction with subsequent figures and otherwise herein. The memory 222 of the network element/function 214 includes a key pair and indicator storage module 232 that stores a mapping of key pair indicators to public/private key pairs and related data generated or otherwise used during key management and authentication operations.

The processors 200 and 220 of the respective UE 102 and network element/function 214 may comprise, for example, microprocessors, application-specific integrated circuits (ASICs), digital signal processors (DSPs) or other types of processing devices, as well as portions or combinations of such elements.

The memories 202 and 222 of the respective UE 102 and network element/function 214 may be used to store one or more software programs that are executed by the respective processors 200 and 220 to implement at least a portion of the functionality described herein. For example, authentication operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective UE 102 and network element/function 214 illustratively comprise transceivers or other communication hardware or firmware that allows the associated system elements to communicate with one another in the manner described herein.

It is apparent from FIG. 2 that UE 102 is configured for communication with network element/function 214 and vice-versa via their respective interface circuitries 204 and 224. This communication involves UE 102 sending data to the network element/function 214, and the network element/function 214 sending data to the UE 102. However, in alternative embodiments, other network elements may be operatively coupled between UE 102 and network element/function 214. The term "data" as used herein is intended to be construed broadly, so as to encompass any type of information that may be sent between user equipment and a core network via a base station element including, but not limited to, identity data, key pairs, key indicators, authentication data, control data, audio, video, multimedia, etc.

It is to be appreciated that the particular arrangement of components shown in FIG. 2 is an example only, and numerous alternative configurations may be used in other embodiments. For example, the user equipment and mobility management function can be configured to incorporate additional or alternative components and to support other communication protocols.

Other system elements, such as eNB/gNB 104, MME/AMF 106, SGW/SMF 110, and PGW 112, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB/gNB and an associated radio network control function.

Figure 3:
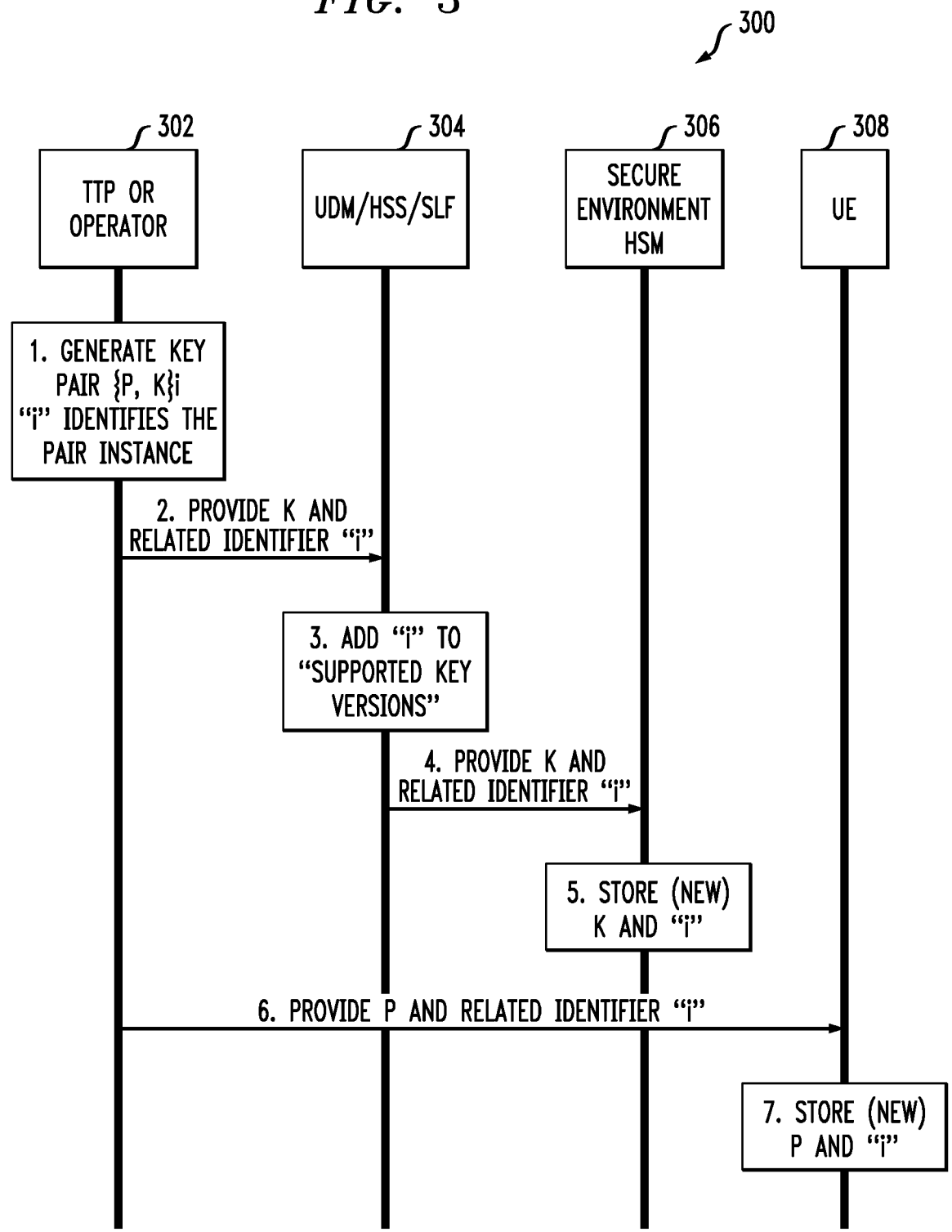
FIG. 3 shows a message flow for a key provisioning procedure in an illustrative embodiment.

FIGS. 3 and 4 illustrate message flows and network configurations within which one or more of the above-described key pair indicator techniques can be implemented. These message flows and network configurations are understood to be illustrative embodiments.

FIG. 3 illustrates a key provisioning procedure 300, in accordance with one illustrative embodiment. In procedure 300, P refers to the public key of a public/private key pair, K refers to the private key of the public/private key pair, and "i" refers to the key pair indicator that uniquely indicates the key pair instance. More particularly, FIG. 3 shows TTP or Operator 302, UDM/HSS/SLF 304, secure environment HSM 306, and UE 308. Reference to "UDM/HSS/SLF" is intended to mean that when there is an SLF in the network, i.e., when there is more than one UDM/HSS and the SLF is needed to determine which UDM/HSS to select given a specific subscriber (UE), the SLF selects the appropriate UDM/HSS, and the selected UDM/HSS performs its typical functions.

In step 1 of the key provisioning procedure flow, TTP or Operator 302 generates key pair $\{P, K\}i$. In step 2, TTP or Operator 302 provides K and related identifier "i" to UDM/HSS/SLF 304. In step 3, UDM/HSS/SLF 304 adds "i" to "supported key versions." In step 4, UDM/HSS/SLF 304 provides K and related identifier "i" to secure environment HSM 306. Secure environment HSM 306 then stores (new) K and "i" in step 5. Note that steps 3, 4 and 5 can alternatively be performed in less steps or one step. In step 6, TTP or Operator 302 provides P and related identifier "i" to UE 308. Finally, in step 7, UE 308 stores (new) P and "i".

FIG. 4 illustrates a UE authentication procedure 400 in an LTE network using encrypted IMSI. SLF or HSS use key pair indicator "i" to decrypt the encrypted IMSI (or a part thereof), in accordance with one illustrative embodiment. More particularly, FIG. 4 shows UE 402, RAN 404, MME 406, HSS/SLF 408 and secure environment HSM 410. RAN refers to a radio access network. Reference to "HSS/SLF" is intended to mean that when there is an SLF in the network, i.e., when there is more than one HSS and the SLF is needed to determine which HSS to select given a specific subscriber (UE), the SLF selects the appropriate HSS, and the selected HSS performs its typical functions.

In step 1 of the UE authentication procedure flow, UE 402 sends an attach request (encrypted IMSI, key indication i) through RAN 404 to MME 406. Note that by referring to encrypted IMSI, this can refer to the portion of the IMSI that is typically encrypted, e.g., MSIN, or all or other parts of IMSI. Further note that IMSI is encrypted with public key Ki and "i" is the key identifier. In step 2, MME 406 then sends the authentication request (encrypted IMSI, key indication "i") to HSS/SLF 408. In step 3, HSS/SLF 408 determines if "i" is valid. In one embodiment, in the case of an invalid key identifier, a corresponding response may be provided to UE 402. Assuming that the key indicator is determined to be valid, in step 4, HSS/SLF 408 sends a decrypt request with the encrypted IMSI and key indicator "i" to secure environment HSM 410. In step 5, secure environment HSM 410 decrypts the encrypted IMSI using Pi (i.e., the private key for the key indicator "i"). In step 6, secure environment HSM 410 sends the decrypted IMSI to HSS/SLF 408. In step 7, the SLF of HSS/SLF 408 selects the HSS, and forwards the authentication request to the selected HSS to generate authentication vectors. The selected HSS of HSS/SLF 408 generates authentication vectors. In step 8, HSS/SLF 408 sends the authentication response including authentication vectors or AVs to MME 406. In step 9, MME 406 sends the attach response including RAND, AUTN, and KASME to UE 402. As is known, RAND is a random challenge, KASME is a master or base key, and AUTN is an authentication token.

It is to be appreciated that the naming of identifiers mentioned herein, e.g., IMSI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
   provisioning two or more cryptographic key pairs for use in a communication system; and
   assigning a key pair indicator to each of the two or more cryptographic key pairs, wherein the key pair indicators are configured to provide indication to a network entity in the communication system as to which of the two or more cryptographic key pairs to use to process a received message;
   wherein the network entity is configured to determine whether a received key pair indicator is associated with a currently valid one of the two or more cryptographic key pairs and, responsive to determining that the received key pair indicator is associated with a currently invalid one of the two or more cryptographic key pairs, providing a new key pair indicator and at least a portion of a new cryptographic key pair provisioned for use in the communication system.

2. The method of claim 1, wherein the provisioning and assigning steps are performed by a trusted platform.

3. The method of claim 1, further comprising providing user equipment in the communication system with a public key of the currently valid one of the one or more cryptographic key pairs and its corresponding key pair indicator.

4. The method of claim 3, further comprising providing at least one network entity in the communication system with a private key of the currently valid one of the one or more cryptographic key pairs and its corresponding key pair indicator.

5. The method of claim 4, wherein the private key is provided to one of a home subscriber server, a user data management function, and a server location function.

6. The method of claim 4, wherein the private key is provided to a secure environment comprising a secure module.

7. An apparatus comprising a processor operatively coupled to a memory configured to perform the steps of claim 1.

8. An article of manufacture comprising a non-transitory computer-readable storage medium having embodied therein executable program code that when executed by a processor causes the processor to perform the steps of claim 1.

9. A method comprising:
   encrypting, at user equipment in a communication system, a message using a first part of a selected one of two or more cryptographic key pairs provisioned for use in the communication system, each of the two or more cryptographic key pairs being assigned a corresponding key pair indicator;
   sending, from the given user equipment, the encrypted message to at least one entity in the communication system along with the key pair indicator assigned to the selected cryptographic key pair;
   wherein the key pair indicator is configured to provide indication to the network entity as to which of the two or more cryptographic key pairs provisioned for use in the communication system is used to encrypt the message such that the network entity can decrypt the message using a second part of the selected cryptographic key pair; and
   receiving, at the user equipment from the network entity, a new key pair indicator and at least a portion of a new cryptographic key pair provisioned for use in the communication system responsive to the network entity determining that the selected cryptographic key pair associated with the key pair indicator in the encrypted message is a currently invalid one of the two or more cryptographic key pairs.

10. The method of claim 9, wherein the first part of the provisioned cryptographic key pair comprises a public key, and the second part of the provisioned cryptographic key pair comprises a private key.

11. The method of claim 9, wherein the message comprises at least a portion of a permanent subscriber identity associated with the user equipment.

12. The method of claim 9, wherein the message is decrypted in a secure execution environment.

13. An apparatus comprising a processor operatively coupled to a memory configured to perform the steps of claim 9.

14. An article of manufacture comprising a non-transitory computer-readable storage medium having embodied therein executable program code that when executed by a processor causes the processor to perform the steps of claim 9.

15. A method comprising:
- receiving, at a network entity in a communication system, a message encrypted using a first part of a selected one of two or more cryptographic key pairs provisioned for use in the communication system along with a key pair indicator assigned to the selected cryptographic key pair;
- using the key pair indicator to identify which of the two or more cryptographic key pairs provisioned for use in the communication system was used to encrypt the received message and to determine a second part of the selected cryptographic key pair to decrypt the received message;
- determining whether the key pair indicator is associated with a currently valid one of the two or more cryptographic key pairs; and
- responsive to determining that the key pair indicator is associated with a currently invalid one of the two or more cryptographic key pairs, providing a new key pair indicator and at least a portion of a new cryptographic key pair provisioned for use in the communication system.

16. The method of claim 15, wherein the first part of the provisioned cryptographic key pair comprises a public key, and the second part of the provisioned cryptographic key pair comprises a private key.

17. The method of claim 15, wherein the message comprises at least a portion of a permanent subscriber identity associated with the user equipment.

18. The method of claim 15, wherein the message is decrypted in a secure execution environment.

19. An apparatus comprising a processor operatively coupled to a memory configured to perform the steps of claim 15.

20. An article of manufacture comprising a non-transitory computer-readable storage medium having embodied therein executable program code that when executed by a processor causes the processor to perform the steps of claim 15.

* * * * *